(12) United States Patent
Park et al.

(10) Patent No.: US 10,844,220 B2
(45) Date of Patent: *Nov. 24, 2020

(54) POLYKETONE RESIN COMPOSITION AND POLYKETONE RESIN MOLDED ARTICLE

(71) Applicant: LG CHEM, LTD., Seoul (KR)

(72) Inventors: Seung Young Park, Daejeon (KR); Sung-Kyoung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 52 days.

This patent is subject to a terminal disclaimer.

(21) Appl. No.: 16/314,825

(22) PCT Filed: Dec. 27, 2017

(86) PCT No.: PCT/KR2017/015579
§ 371 (c)(1),
(2) Date: Jan. 2, 2019

(87) PCT Pub. No.: WO2018/124745
PCT Pub. Date: Jul. 5, 2018

(65) Prior Publication Data
US 2020/0010676 A1    Jan. 9, 2020

(30) Foreign Application Priority Data

Dec. 27, 2016  (KR) .................. 10-2016-0180048
Dec. 26, 2017  (KR) .................. 10-2017-0180269

(51) Int. Cl.
*C08L 67/04* (2006.01)
*C08L 73/00* (2006.01)
*C08L 69/00* (2006.01)

(52) U.S. Cl.
CPC .............. *C08L 73/00* (2013.01); *C08L 67/04* (2013.01); *C08L 69/00* (2013.01); *C08L 2205/03* (2013.01)

(58) Field of Classification Search
CPC ..... C08G 67/02; C08G 64/0208; C08L 69/00; C08L 65/00; C08L 2205/03
See application file for complete search history.

(56) References Cited

U.S. PATENT DOCUMENTS

| | | | |
|---|---|---|---|
| 4,880,903 A | | 11/1989 | Van Broekhoven et al. |
| 4,880,908 A | * | 11/1989 | Lutz ............... C08L 73/00 525/468 |
| H1601 H | * | 10/1996 | Machado ................ 525/421 |
| 5,973,048 A | | 10/1999 | Van Helmond et al. |
| 2003/0013821 A1 | * | 1/2003 | Tan ................. D04H 1/4382 525/413 |
| 2006/0276582 A1 | | 12/2006 | Mochizuki et al. |
| 2007/0134411 A1 | | 6/2007 | Cont et al. |
| 2008/0108742 A1 | | 5/2008 | Miyamoto et al. |
| 2008/0274360 A1 | | 11/2008 | Gallucci |
| 2009/0065730 A1 | * | 3/2009 | Yoshino ............... C08L 71/02 252/62.2 |
| 2009/0236565 A1 | * | 9/2009 | Mercx .................. C08J 3/201 252/511 |
| 2011/0178196 A1 | * | 7/2011 | Steinke ............... C08L 69/00 521/135 |
| 2013/0331500 A1 | | 12/2013 | Yokoe et al. |

FOREIGN PATENT DOCUMENTS

| | | |
|---|---|---|
| CN | 101878272 A | 11/2010 |
| CN | 103403098 A | 11/2013 |
| JP | 10-1601 A | 1/1998 |
| JP | 2002114899 A | 4/2002 |
| JP | 2003213113 A | 7/2003 |
| JP | 2006-335909 A | 12/2006 |
| JP | 2007131757 A | 5/2007 |
| KR | 10-2008-0092355 A | 10/2008 |
| KR | 10-2010-0016205 A | 2/2010 |
| KR | 10-2010-0075861 A | 7/2010 |
| KR | 10-1527520 B1 | 6/2015 |
| KR | 10-2016-0003616 A | 1/2016 |
| KR | 1020160038590 A | 4/2016 |
| KR | 10-2016-0059899 A | 5/2016 |
| KR | 10-2016-0059900 A | 5/2016 |
| KR | 10-1706052 B1 | 2/2017 |
| KR | 10-2017-0062561 A | 6/2017 |
| WO | 2006030859 A1 | 3/2006 |
| WO | WO-2016072642 A2 * | 5/2016 .............. A47J 27/08 |

OTHER PUBLICATIONS

Computer Translation of WO 2016/072642 (2016) (Year: 2016).*
"Poly(ethylene carbonate)s, part I: Syntheses and Structural Effects on Biodegradation"; Acemoglu, et al; Journal of controlled Release 49; 263-276 (1997).
"Copolymerization of Carbon Dioxide and Epozide"; Polymer Letters; vol. 7, pp. 287-292 (1969).
Chen et al., "Preparatation and Properties of Biodegradeble Blends of Poly (Propylene Carbonate) and Poly (Lactic Acid)," Polymer Materials Science and Engineering, vol. 26, No. 3, Mar. 31, 2010, pp. 142-145.

* cited by examiner

*Primary Examiner* — Robert C Boyle
(74) *Attorney, Agent, or Firm* — Dentons US LLP

(57) ABSTRACT

The present invention relates to a polyketone resin composition and a polyketone resin molded article produced by using the composition, and particularly to a polyketone resin and a polyketone resin molding which comprise a predetermined content of polyketone and polyalkylene carbonate and thus have enhanced melt stability of polyketone.

11 Claims, 2 Drawing Sheets

[FIG. 1]
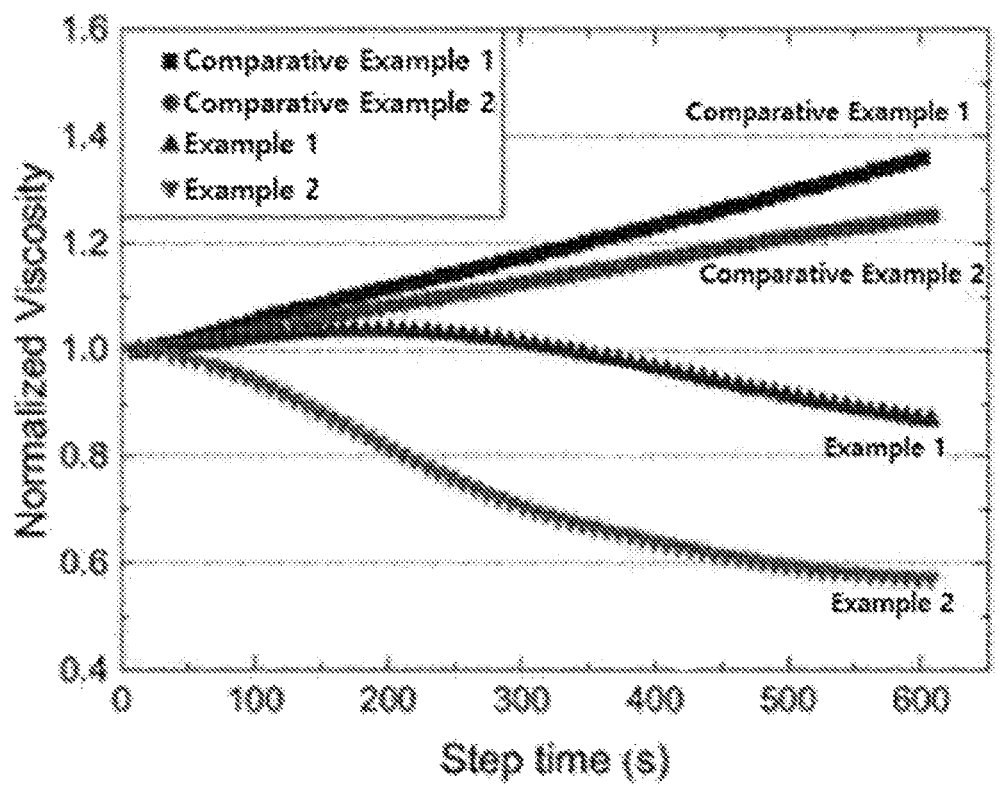

[FIG. 2]
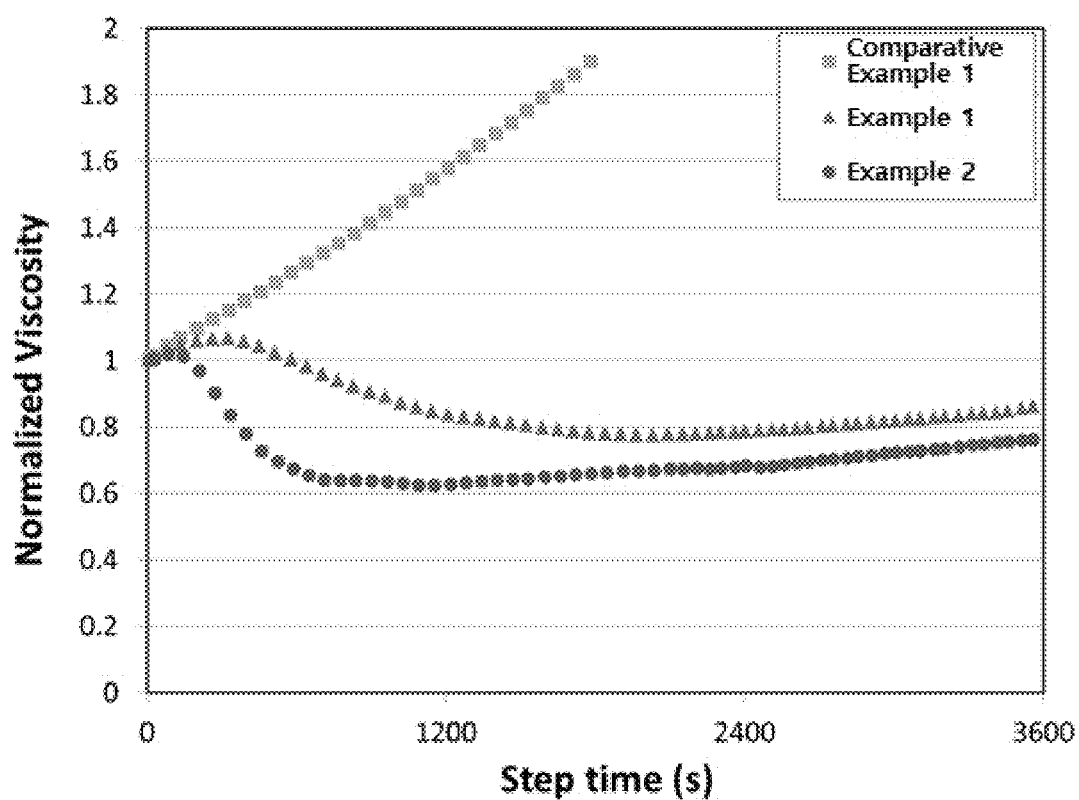

POLYKETONE RESIN COMPOSITION AND POLYKETONE RESIN MOLDED ARTICLE

CROSS-REFERENCE TO RELATED APPLICATION(S)

This application is a National Stage Application of International Application No. PCT/KR2017/015579 filed on Dec. 27, 2017, which claims priority to and the benefits of Korean Patent Application Nos. 10-2016-0180048, filed on Dec. 27, 2016, and 10-2017-0180269, filed on Dec. 26, 2017, with the Korean Intellectual Property Office, the disclosures of which are incorporated herein by reference in their entireties.

TECHNICAL FIELD

The present invention relates to a polyketone resin composition and a polyketone resin molded article produced using the same, and more specifically, to a polyketone resin and a polyketone resin molded article which contain polyketone and polyalkylene carbonate in a specific amount, thereby having enhanced melt stability and processability of the polyketone.

BACKGROUND ART

In modern society, various types of thermoplastic or thermosetting plastic resins are used in various industrial applications, and with the development of the electronics, chemistry, and building industries, demands for high-performance plastics having excellent physical properties are increasing.

Polyketone has the characteristic that it is superior in physical and chemical properties such as heat resistance, chemical resistance, barrier property (fuel permeation resistance) and abrasion resistance while being economically inexpensive in terms of raw materials and polymerization process, in comparison with engineering plastics widely used in various industrial applications, such as polyamide, polyester and polycarbonate.

Accordingly, interest in carbon monoxide-based polymer resins, which are known as polyketone, polyketone resins or the like, is increasing, and U.S. Pat. No. 4,880,903 and the like disclose a linear alternating polyketone terpolymer composed of carbon monoxide, ethylene and olefinically unsaturated hydrocarbons such as propylene.

As a method of preparing such a polyketone polymer, usually, a method of polymerizing carbon monoxide and olefinic hydrocarbons using a catalyst composition comprising a Group VIII metal compound selected among palladium, cobalt or nickel, an anion of a non-hydrohalogenic acid (non-hydrohalogenic conjugate base), and a ligand of phosphorus, arsenic or antimony are known.

However, such polyketone polymer has a problem of imposing many restrictions on the processing conditions, for example, the viscosity of the resin molten under a resin molting condition at high temperature is continuously increased with time, and thus the processability is decreased, and the processing equipment must be frequently shut down for purging and the like.

In this regard, research on polyketone resins having excellent melt stability and processability under a high-temperature condition while maintaining existing excellent physical properties is required.

DETAILED DESCRIPTION OF THE INVENTION

Technical Problem

It is an object of the present invention to provide a polyketone resin composition which is excellent in melt stability under a high-temperature condition and thus has excellent processability.

Technical Solution

The present invention provides a polyketone resin composition comprising 1 part by weight or more and less than 100 parts by weight of polyalkylene carbonate with respect to 100 parts by weight of polyketone.

According to one embodiment, the polyketone may include at least one repeating unit represented by the following Chemical Formula 1.

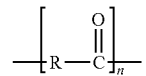

[Chemical Formula 1]

in Chemical Formula 1,

R is a linear or branched alkylene having 1 to 10 carbon atoms; an arylene having 3 to 10 carbon atoms; an alkylether having 1 to 10 carbon atoms; an arylether having 3 to 10 carbon atoms; an alkylester having 2 to 10 carbon atoms; or an aryl ester having 4 to 10 carbon atoms, and n is an integer of 10 to 1000.

More specifically, the polyketone may be preferably an aliphatic polyketone including ethylene, propylene, isopropylene, or butylene units.

According to one embodiment of the present invention, the polyketone may be more preferably a binary copolymer or a ternary copolymer.

And, the polyketone may have a weight average molecular weight of about 10,000 to about 1,000,000 g/mol.

According to another embodiment of the present invention, the polyalkylene carbonate may include a repeating unit represented by the following Chemical Formula 2.

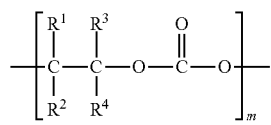

[Chemical Formula 2]

in Chemical Formula 2, $R^1$ to $R^4$ are each independently hydrogen, a linear or branched alkyl group having 1 to 20 carbon atoms, an aryl group having 6 to 20 carbon atoms, an alkenyl group having 1 to 20 carbon atoms or a cycloalkyl group having 3 to 20 carbon atoms; at least two of $R^1$ to $R^4$ may be connected to each other to form a cycloalkyl group having 3 to 10 carbon atoms; and m is an integer of 10 to 1,000.

In this case, the polyalkylene carbonate may have a weight average molecular weight of 10,000 to 1,000,000 g/mol. Specifically, the polyalkylene carbonate may be, for example, at least one selected from the group consisting of polyethylene carbonate, polypropylene carbonate, polypentene carbonate, polyhexene carbonate, polyoctenecarbonate, polycyclohexene carbonate and a copolymer thereof.

According to another embodiment of the present invention, the polyketone resin composition may further include about 1 to about 30 parts by weight of polylactide with respect to 100 parts by weight of the polyketone.

Moreover, the polylactide may have a weight average molecular weight of 10,000 to 1,000,000 g/mol.

Due to this characteristic composition, the polyketone resin composition may have a viscosity increase rate of about 10% or less at about 240° C.

In addition, the present invention provides a polyketone resin molded article which is produced using the above-described polyketone resin composition.

Advantageous Effects

The polyketone resin composition of the present invention has excellent melt stability and hardly causes an increase in viscosity of a molten resin even under a high-temperature condition, and thus can maintain excellent processability and greatly increase the operation time of the processing equipment, and the excellent physical and chemical properties possessed by polyketone can be practically applied in various industrial fields.

BRIEF DESCRIPTION OF DRAWINGS

FIGS. 1 and 2 are graphs showing a change in viscosity vs. time with respect to the polyketone resin compositions according to Examples and Comparative Examples of the present invention.

DETAILED DESCRIPTION OF THE EMBODIMENTS

The polyketone resin composition of the present invention comprises 1 part by weight or more and less than 100 parts by weight of polyalkylene carbonate with respect to 100 parts by weight of polyketone.

In addition, the polyketone resin molded article of the present invention is produced using the above-described polyketone resin composition.

The terms "first," "second," etc. may be used herein to describe various components, and these terms are used only for distinguishing one element from others.

Further, terms used herein are used only to describe particular embodiments only and is not intended to be limiting of the invention. As used herein, singular expressions "a," "an" and "the" are intended to include plural expressions as well, unless the context clearly indicates otherwise. Also, throughout the specification, it should be understood that the terms "comprise," "include", "have", etc. are used herein to specify the presence of stated features, numbers, steps, components or combinations thereof, but do not preclude the presence or addition of one or more other features, numbers, steps, components, or combinations thereof.

Since the embodiments of the present invention are susceptible to various modifications and alternative forms, specific embodiments thereof will be illustrated and described in detail below. It should be understood, however, that the present invention is not limited to the particular embodiments disclosed, but on the contrary, the invention is to cover all modifications, equivalents, and alternatives falling within the spirit and scope of the invention.

Hereinafter, the polyketone resin composition and the polyketone resin molded article according to the present invention will be described in detail.

The polyketone resin composition according to one aspect of the present invention includes 1 part by weight or more and less than 100 parts by weight of polyalkylene carbonate with respect to 100 parts by weight of polyketone.

The polyketone may include at least one repeating unit represented by the following Chemical Formula 1.

[Chemical Formula 1]

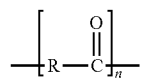

in Chemical Formula 1,

R is a linear or branched alkylene having 1 to 10 carbon atoms; an arylene having 3 to 10 carbon atoms; an alkylether having 1 to 10 carbon atoms; an arylether having 3 to 10 carbon atoms; an alkylester having 2 to 10 carbon atoms; or an aryl ester having 4 to 10 carbon atoms, and n is an integer of 10 to 1000.

The polyketone polymer having the structure as described above is produced by the reaction of carbon monoxide and a compound containing an unsaturated double bond. Recently, there has been an increasing interest in alternating copolymers in which repeating units composed of carbon monoxide and at least one or more ethylenically unsaturated hydrocarbon are alternately connected.

The polyketone polymer thus obtained has a relatively high molecular weight and is widely used as a high-quality thermoplastic resin having excellent physical properties in molded articles such as food and beverage containers, housings for electronic products, and automobile parts.

However, due to the structure containing highly reactive carbonyl carbons in the molecule, the polyketone polymer easily undergoes a crosslinking reaction during melt processing such as extrusion and injection molding.

More specifically, the aldol condensation proceeds on the carbonyl functional groups in the polyketone, and the polymer chains can be crosslinked to each other. Consequently, the viscosity is increased and the processablilty can be remarkably lowered.

The present inventors have found that the melt stability of a polyketone can be remarkably increased by a method of mixing a specific amount of polyalkylene carbonate in the polyketone, thereby completing the present invention.

Within the polyketone polymer structure, an aldol condensation reaction may occur in which alpha hydrogen atom adjacent to carbonyl groups can be easily removed under high-temperature melting conditions, and enolate anions thus formed attack the adjacent central carbonyl carbon, and a curing proceeds while releasing water molecular.

When the aldol condensation reaction continuously occurs, the viscosity of the resin continuously increases, which increases the load on the processing equipment, and eventually the processing equipment can no longer be operated after a certain period of time. In this case, it is necessary to purge the resin in the equipment using another resin for a long time, or to restart after removal of the cured resin.

However, in the case of polyketone, its molecular structure similar to that of polyalkylene carbonate, and thus compatibility between resins is very good. Further, when the polyalkylene carbonate is present around the polyketone, a carbonyl alpha hydrogen is removed under a high-temperature melting condition. Even if an enolate anion is formed, it forms a preferential bond with a carbonate group of the polyalkylene carbonate before attacking the central carbonyl carbon of the polyketone, and it becomes possible to suppress an increase in viscosity due to the crosslinking/curing+ reaction.

Consequently, the polyalkylene carbonate can suppress the aldol condensation reaction between polyketones, and it becomes possible to effectively maintain the melt stability of the polyketone even under a high-temperature condition.

The polyketone resin composition according to one aspect of the present invention includes 1 part by weight or more and less than 100 parts of a polyalkylene carbonate with respect to 100 parts by weight of polyketone, and thus can effectively suppress the aldol condensation reaction of the carbonyl carbon in the polyketone by the above-described principle.

Thereby, during the processing of a polyketone polymer, it is possible to effectively prevent the phenomenon where the viscosity of the resin continuously rises with time in a high-temperature molten state. Even when the processing instrument is operated over a long time period by using polyketone, it is possible to minimize the shutdown for purging and removal of the cured resin and thus maintain high processability.

Specifically, the polyketone resin composition according to one embodiment of the present invention may contain 1 part by weight or more, more preferably about 5 parts by weight or about 10 parts by weight or more of polyalkylene carbonate with respect to 100 parts by weight of polyketone for achieving the above-mentioned effects. Within a range that does not impair the basic chemical and physical properties of the polyketone, the polyketone resin composition may contain less than 100 parts by weight, or about 60 parts by weight or less, more preferably about 50 parts by weight or about 25 parts by weight or less of polyalkylene carbonate with respect to 100 parts by weight of polyketone.

When the polyalkylene carbonate is used in an amount less than the above range, the aldol condensation of the polyketone cannot be effectively suppressed, which is problematic in that the above-described effects of the present invention capable of increasing the melt stability at a high temperature cannot reach the expectations. When the polyalkylene carbonate is used in an excessively large amount, there is a problem that the inherent mechanical properties of the polyketone are deteriorated.

According to one embodiment of the invention, the polyketone may be preferably an aliphatic polyketone containing ethylene, propylene, isopropylene or butylene units, and it may be more preferable to use a form of a binary copolymer or a ternary copolymer containing at least one of these repeating units.

The polyketone may have a weight average molecular weight of about 10,000 to about 1,000,000 g/mol.

According to another embodiment of the present invention, the polyalkylene carbonate may include a repeating unit represented by the following Chemical Formula 2.

[Chemical Formula 2]

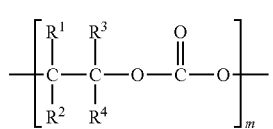

in Chemical Formula 2, $R^1$ to $R^4$ are each independently hydrogen, a linear or branched alkyl group having 1 to 20 carbon atoms, an aryl group having 6 to 20 carbon atoms, an alkenyl group having 1 to 20 carbon atoms or a cycloalkyl group having 3 to 20 carbon atoms; at least two of $R^1$ to $R^4$ may be connected to each other to form a cycloalkyl group having 3 to 10 carbon atoms; and m is an integer of 10 to 1,000.

In this case, the polyalkylene carbonate may have a weight average molecular weight of about 10,000 to about 1,000,000 g/mol, preferably about 50,000 to about 500,000 g/mol. As the polyalkylene carbonate has the degree of polymerization and the weight average molecular weight as described above, the molded article obtained therefrom can exhibit mechanical properties such as appropriate strength and flexibility.

Specifically, such polyalkylene carbonate may be at least one selected from the group consisting of polyethylene carbonate, polypropylene carbonate, polypentene carbonate, polyhexene carbonate, polyoctene carbonate, polycyclohexene carbonate and copolymers thereof.

The polyalkylene carbonate is an amorphous polymer containing a repeating unit represented by the above chemical formula.

In addition, the polyalkylene carbonate has a relatively low glass transition temperature (Tg) of about 40° C. or less, for example, about 10° C. to about 40° C., and can be controlled within this range.

The method for preparing the polyalkylene carbonate used in the present invention is not particularly limited, and for example, the polyalkylene carbonate can be obtained by copolymerizing an epoxide-based compound and carbon dioxide. Alternatively, the polyalkylene carbonate can be obtained by a ring-opening polymerization of cyclic carbonates. The copolymerization of the alkylene oxide and carbon dioxide can be carried out in the presence of a metal complex compound such as zinc, aluminum or cobalt.

When the polyakylene carbonate is prepared through copolymerization using an epoxide-based compound and carbon dioxide in the presence of an organic metal catalyst, the epoxide-based compounds may be ethylene oxide, propylene oxide, 1-butene oxide, 2-butene oxide, isobutylene oxide, i-pentene oxide, 2-pentene oxide, 1-hexene oxide, 1-octene oxide, cyclopentene oxide, cyclonexene oxide, styrene oxide, butadiene monoxide, or the like, and two or more epoxide-based compounds selected among them can be used, but the present invention is not limited thereto.

The polyalkylene carbonate may be a single polymer including the repeating unit represented by Chemical Formula 2 above; or a copolymer including two or more kinds of repeating units within the scope of Chemical Formula 2 above; or a copolymer including an alkylene oxide-based repeating unit together with the repeating unit represented by Chemical Formula 2 above.

However, in order for polyalkylene carbonate to maintain its intrinsic physical properties (or example, strength, elongation, flexibility, low glass transition temperature, and the like; attributable to the repeating unit represented by Chemical Formula 2 above, the polyalkylene carbonate may be a copolymer containing the repeating unit represented by Chemical Formula 2 in an amount of about 40% by weight or more, preferably about 60% by weight or more, and more preferably about 80% by weight or more.

According to one embodiment of the present invention, the polyalkylene carbonate may be, for example, polyethylene carbonate, polypropylene carbonate, polypentene carbonate, polyhexene carbonate, polyoctenecarbonate, polycyclohexene carbonate, or a copolymer thereof, but the present invention is not limited thereto. The $R_1$ to R4 may be selected as an appropriate functional group in consideration of physical properties of the resin to be finally obtained and blending with the polyketone.

For example, when the functional group is hydrogen or a functional group having a relatively small number of carbon atoms, it may be more advantageous in terms of flexibility and compatibility with polyketone. When it is a functional group having a relatively large number of carbon atoms, it may be advantageous in terms of mechanical properties such as the strength of the resin.

In the polyalkylene carbonate, the degree of polymerization (m) of the repeating unit represented by Chemical Formula 2 above may be about 10 to about 1,000 and preferably about 50 to about 500.

According to another embodiment of the present invention, the polyketone resin composition may further contain 1 to 30 parts by weight of polylactide with respect to 100 parts by weight of the polyketone.

The polylactide can primarily improve the thermal stability of the polyalkylene carbonate, and thereby play a role in more stably kneading the polyketone and the polyalkylene carbonate. When the polylactide is contained in an excessively smaller amount than the above range, decomposition of polyalkylene carbonate may occur at the time of kneading polyketone and polyalkylene carbonate at high temperature. When the polylactide is contained in an excessively larger amount than the above range, there may be a problem that the physical properties of the polyketone is deteriorated.

Generally, lactides may be classified into L-lactide composed of L-lactic acid, D-lactide composed of D-lactic acid and meso-lactide composed of one L-form and one D-form. Further, a mixture of L-lactide and D-lactide in a ratio of 50:50 is referred to as D,L-lactide or rac-lactide. It is known that, when L-lactide or D-lactide having high optical purity, among these lactides, is polymerized, L- or D-polylactide (PLLA or PDLA) having high stereoregularity is obtained, and that the polylactide obtained in this way is rapidly crystallized and has high crystallinity compared to polylactide having low optical purity. However, in the present specification, the "lactide monomers" include types of lactides regardless of the difference in characteristics of lactides according to the types thereof and the difference in characteristics of polylactides derived therefrom.

The molecular structure of the polylactide may be that polymerized from L lactic acid, D-lactic acid or L,D-lactic acid. The polylactide may be prepared by a process including the step of forming the repeating units by the ring-opening polymerization of lactide monomers. The polymer obtained after the completion of the ring-opening polymerization and the repeating unit formation process may be referred to as "polylactide" or "polylactide resin". In this case, the category of lactide monomers may include all types of lactides as described above.

According to one embodiment of the present invention, the polylactide may have the degree of polymerization of preferably about 50 to about 500, and may have a weight average molecular weight of about 10,000 to about 1,000,000 g/mol. As the polylactide has the above-described degree of polymerization and weight average molecular weight, the polyketone resin composition obtained therefrom may maintain the basic physical properties of the polyketone, and achieve excellent thermal stability even in a high-temperature molten state.

The category of the polymer referred to as "polylactide" may include all the polymers obtained after the completion of the ring-opening polymerization and the repeating unit formation process, for example, unpurified or purified polymers obtained after the completion of the ring-opening polymerization, polymers included in a liquid or solid resin composition before the formation of a product, polymers included in plastic or textile after the formation of a product, and the like.

As methods of preparing a polylactide resin, a method of directly polycondensing lactic acid and a method of ring-opening polymerizing lactide monomers in the presence an organic metal catalyst are known. The method of ring-opening polymerizing lactide monomers is complicated and needs high cost compared to the polycondensation because lactide monomers must be previously prepared from lactic acid. However, when this method is used, a polylactide resin having a relatively large molecular weight can be easily obtained by the ring-opening polymerization of lactide monomers using a metal catalyst, and the polymerization rate thereof can be easily adjusted. Therefore, this method is commercially widely available.

Due to these characteristic compositions, the polyketone resin composition according to one embodiment of the present invention may have a viscosity increase rate of about 10% or less at about 240° C. More specifically, the polyketone resin composition has a viscosity increase rate of about 10% or less, or about 0% to about 10% within 300 seconds when exposed to a temperature condition of about 240° C. Thus, the viscosity hardly increases or the viscosity is rather lowered, and the processabilty can be very excellent.

Various kinds of additives may be added to the resin composition of the present invention according to the use thereof. Examples of the additives may include, but not limited to, additives for modification, colorants (pigment, dye, etc.), fillers (carbon black, titanium oxide, talc, calcium carbonate, clay, etc.), and the like. Examples of the additives for modification may include a dispersant, a lubricant, a plasticizer, a flame retardant, an antioxidant, an antistatic agent, a light stabilizer, an ultraviolet absorber, a crystallization promoter, and the like. These various kinds of additives may also be added when a pellet is prepared from the polyalkylene carbonate resin composition or when this pellet is formed into a molded article.

As the method for preparing the polyketone resin composition of the present invention, various known methods can be used. As the method for obtaining a uniform mixture, for example, a method of adding the above-mentioned polyketone, polyalkylene carbonate, and polystyrene at a predetermined ratio, and mixing them by a Henzel mixer, a ribbon blender, a blender or the like cab be used. A melt-kneading may be performed using a VAN Antonio Louis Barye mixer, a monoaxial compressor, a biaxial compressor or the like. The shape of the resin composition of the present invention is not particularly limited, and for example, the shape thereof may be those processed into a compound in fluid state (melted with the mixture), a strand, a sheet, a flat film, a pellet or the like.

According to another aspect of the present invention, there is provided a polyketone resin molded article produced using the above-described polyketone resin composition.

Examples of the molded article produced from the resin composition may include a film, a film laminate, a sheet, a filament, a nonwoven fabric, an injection molded article, and the like.

Examples of the methods of obtaining a molded article using the resin composition of the present invention may include injection molding, compression molding, injection-compression molding, gas injection molding, foam injection molding, inflation, T die, calendar, blow molding, vacuum molding, extrusion molding, and the like. In addition, the processing method generally used in the technical field to which the present invention belongs can be used without particular limitation.

Hereinafter, the function and effect of the present invention will be described in more detail by way of specific examples of the invention. However, these examples are set forth to illustrate the invention, and the scope of the invention is not limited thereto.

EXAMPLE

Preparation of Polyethylene Carbonate Resin

A polyethylene carbonate resin was prepared by copolymerizing ethylene oxide and carbon dioxide using diethyl-zinc catalyst through the following method (Journal of Polymer Science B 1969, 7, 287; Journal of Controlled release 1997, 49, 263)

1 g of a dry diethyl-zinc catalyst and 10 mL of a dioxane solvent were introduced into an autoclave reactor equipped with a stirrer, and then 0.1 g of diluted purified water was added to 5 ml of dioxane solvent while stirring slowly. Subsequently, carbon dioxide was charged in the reactor to a pressure of about 10 atm, and then the solution was stirred at 120° C. for 1 hour. Then, 10 g of purified ethylene oxide was added, carbon dioxide was again charged to a pressure of about 50 atm, and then temperature was adjusted to 60° C. and the reaction was performed for about 48 hours. After the reaction, unreacted ethylene oxide was removed under low pressure, and the reaction product was dissolved in a dichloromethane solvent. Then, the dissolved reaction product was washed with an aqueous hydrochloric acid solution (0.1 M), and then precipitated with a methanol solvent to obtain a polyethylene carbonate resin. The amount of the obtained polyethylene carbonate resin was about 15 g, the formation thereof was observed by nuclear magnetic resonance spectroscopy, and it was confirmed that the weight average molecular weight thereof analyzed by gel permeation chromatography (GPC) was 174,000 g/mol.

Preparation of Polylactide Blended Pellets

Polylactide (NatureWorks PLA 3001D) was mixed with the polyethylene carbonate prepared above to prepare pellets so that the polylactide content was 5 wt %.

Example 1

50 g of polyalkylene carbonate (weight average molecular weight: 174,000 g/mol, containing 5 wt % of NatureWorks PLA 3001D) pellets and 450 g of polyketone (Hyosung, M620A) pellets were dry blended at room temperature.

The resin composition thus obtained was prepared in the form of pellets using a twin screw extruder (BA-19, BAUTECH), and the obtained resin composition in the form of pellets was dried overnight in a vacuum oven at 40° C. and then used.

Example 2

100 g of polyalkylene carbonate (weight average molecular weight: 174,000 g/mol, containing 5 wt % of MatureWorks PLA 30010) pellets and 400 g of polyketone (Hyosung, M620A) pellets were dry-blended at room temperature.

The resin composition thus obtained was prepared in the form of pellets using a twin screw extruder (BA-19, BAUTECH), and the obtained resin composition in the form of pellets was dried overnight in a vacuum oven at 40° C. and then used.

Comparative Example 1

500 g of polyketone (Hyosung, M620A) pellets were dried overnight a vacuum oven at 40° C. and then used.

Comparative Example 2: Re-Extrusion of Polyketone 500 g of polyketone (Hyosung, M620A) pellets were re-extruded using a twin screw extruder (BA-19, BAUTECH) to prepare in the form of pellets, and the obtained resin composition in the form of pellets was dried overnight in a vacuum oven at 40° C. and then used.

Experimental Example

For the pellets prepared in Examples and Comparative Examples, the viscosity change with time at 240° C. was measured using a rotational rheometer (ARES G2, TA Instruments).

FIG. 1 is a graph shown by measuring a change in viscosity vs. time for 10 minutes (600 seconds) with respect to the polyketone resin compositions according to Examples and Comparative Examples of the present invention.

Referring to FIG. 1, it can be confirmed that in the case of Comparative Example 1 in which only polyketone was used alone and Comparative Example 2 in which the polyketone was re-extruded, the viscosity was continuously increased with the lapse of time.

This is a phenomenon that occurs in polyketone resin as the aldol condensation reaction takes place after the addition of the nucleophilic group to the carbonyl group and the crosslinking between the respective polymer chains proceeds.

However, according to Examples of the present invention, it can be confirmed that polyethylene carbonate was added to effectively suppress the aldol condensation reaction between the polyketone polymer chains.

Specifically, it can be confirmed that in the case of Example 1, the viscosity increased slightly at the beginning under a high-temperature condition, but a high melt stability was exhibited soon and the viscosity was lowered. It can be clearly confirmed that in the case of Example 2, almost no rise in viscosity occured from the beginning.

FIG. 2 is a graph shown by measuring a change in viscosity vs. time for 1 hour (3,600 seconds) with respect to the polyketone resin compositions according to Examples and Comparative Examples of the present invention.

Referring to FIG. 2, it can be confirmed that the melt stability of the polyalkylene carbonate was maintained not only for a short period of time but also for a long period of time.

Accordingly, it can be confirmed that the polyketone resin composition according to Examples of the present invention had a high melt stability for a long period of time, and it can be inferred that it is possible to have excellent processability even under high-temperature processing conditions such as molding.

The invention claimed is:

1. A polyketone resin composition comprising:
100 parts by weight of polyketone; and 1 part by weight or more and less than 100 parts by weight of polyalkylene carbonate with respect to 100 parts by weight of the polyketone, wherein the polyalkylene carbonate includes a repeating unit represented by Chemical Formula 2:

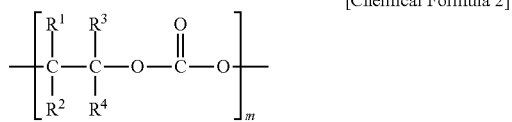

[Chemical Formula 2]

wherein, in Chemical Formula 2, $R^1$ to $R^4$ are each independently hydrogen, a linear or branched alkyl group having 1 to 20 carbon atoms, aryl group having 6 to 20 carbon atoms, an alkenyl group having 1 to 20 carbon atoms or a cycloalkyl group having 3 to 20 carbon atoms; at least two of $R^1$ to $R^4$ are optionally connected to each other to form a cycloalkyl group having 3 to 10 carbon atoms; and m is an integer of 10 to 1,000.

2. The polyketone resin composition according to claim 1, wherein the polyketone includes at least one repeating unit represented by Chemical Formula 1:

[Chemical Formula 1]

wherein, in Chemical Formula 1,

R is a linear or branched alkylene having 1 to 10 carbon atoms; an arylene having 3 to 10 carbon atoms; an alkylether having 1 to 10 carbon atoms; an arylether having 3 to 10 carbon atoms; an alkylester having 2 to 10 carbon atoms; or an arylester having 4 to 10 carbon atoms, and n is an integer of 10 to 1000.

3. The polyketone resin composition according to claim 1, wherein the polyketone is an aliphatic polyketone including ethylene, propylene, isopropylene, or butylene units.

4. The polyketone resin composition according to claim 1, wherein the polyketone is a binary copolymer or a ternary copolymer.

5. The polyketone, resin composition according to claim 1, wherein the polyketone has a weight average molecular weight of 10,000 to 1,000,000 g/mol.

6. The polyketone resin composition according to claim 1, wherein the polyalkylene carbonate has a weight average molecular weight of 10,000 to 1,000,000 g/mol.

7. The polyketone resin composition according to claim 1, wherein the polyalkylene carbonate is at least one selected from the group consisting of polyethylene carbonate, polypropylene carbonate, polypentene carbonate, polyhexene carbonate, polyoctenecarbonate, polycyclohexene carbonate and a copolymer thereof.

8. The polyketone resin composition according to claim 1, wherein the composition further comprises 1 to 30 parts by weight of polylactide with respect to 100 parts by weight of the polyketone.

9. The polyketone resin composition according to claim 8, wherein the polylactide has a weight average molecular weight of 10,000 to 1,000,000 g/mol.

10. The polyketone resin composition according to claim 1, wherein the composition has a viscosity increase rate of 10% or less within 300 seconds when exposed to a temperature condition of 240° C.

11. A polyketone resin molded article which is produced using the polyketone resin composition of claim 1.

* * * * *